(12) United States Patent
Kori et al.

(10) Patent No.: US 10,243,430 B2
(45) Date of Patent: Mar. 26, 2019

(54) ROTATING ELECTRICAL MACHINE WITH ROTOR AND STATOR, WITH A STATOR CORE INCLUDING PACKET CORES

(71) Applicant: Hitachi, Ltd., Chiyoda-ku, Tokyo (JP)

(72) Inventors: Daisuke Kori, Tokyo (JP); Ryuichiro Iwano, Tokyo (JP); Masanori Sawahata, Tokyo (JP); Kazuo Nishihama, Tokyo (JP); Motonobu Iizuka, Tokyo (JP); Takayuki Koyama, Tokyo (JP); Kenichi Sugimoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 266 days.

(21) Appl. No.: 15/381,766

(22) Filed: Dec. 16, 2016

(65) Prior Publication Data

US 2017/0187264 A1 Jun. 29, 2017

(30) Foreign Application Priority Data

Dec. 25, 2015 (JP) .................................. 2015-252801

(51) Int. Cl.
*H02K 9/10* (2006.01)
*H02K 1/12* (2006.01)
*H02K 7/14* (2006.01)

(52) U.S. Cl.
CPC ................ *H02K 9/10* (2013.01); *H02K 1/12* (2013.01); *H02K 7/14* (2013.01)

(58) Field of Classification Search
CPC .............. H02K 9/10; H02K 1/12; H02K 7/14
See application file for complete search history.

(56) References Cited

U.S. PATENT DOCUMENTS

| 7,019,429 B1* | 3/2006 | Larsson | H02K 3/48 174/DIG. 32 |
|---|---|---|---|
| 2012/0217756 A1* | 8/2012 | Balzer | H02K 5/20 290/55 |
| 2013/0076168 A1* | 3/2013 | Mennnninger | H02K 5/20 310/54 |
| 2017/0126098 A1* | 5/2017 | Furukawa | H02K 9/04 |

FOREIGN PATENT DOCUMENTS

| JP | 2010-166816 A | 7/2010 |
|---|---|---|
| JP | 2013-74654 A | 4/2013 |
| JP | 2013-90412 A | 5/2013 |

* cited by examiner

*Primary Examiner* — Emily P Pham
(74) *Attorney, Agent, or Firm* — Crowell & Moring LLP

(57) ABSTRACT

The invention provides a rotating electrical machine system in which an air volume of a refrigerant is increased near the center of a rotating electrical machine in the axial direction is improved. The rotating electrical machine includes a rotor and a stator, in which the stator core, laminated electromagnetic steel sheets formed by laminating a plurality of electromagnetic steel sheets in the axial direction are divided into a plurality of sets of packet cores, and between one of the packet cores of the plurality of sets and another packet core adjacent to it, there is formed a duct providing a flow channel of the stator, and in a duct situated at the center side from both ends in the axial direction among the duct, there is a portion of two packet cores facing each other across the duct, a diameter direction length of the two packet cores becoming long.

8 Claims, 19 Drawing Sheets

ROTATING ELECTRICAL MACHINE WITH ROTOR AND STATOR, WITH A STATOR CORE INCLUDING PACKET CORES

BACKGROUND OF THE INVENTION

The invention relates to a rotating electrical machine and a system.

In ordinary industrial plants, a large part of compressor systems is installed on the ground, but gas plants include, for example, offshore plants and compressors used undersea. Also, some of compressors are operated in the ground 3000 m deep. Under such an environment, a rotating electrical machine used together with a compressor is required to be smaller and lighter. Because a high-power compressor system has to be installed in a limited installation space, it becomes essential to reduce a system scale including a compressor and a rotating electrical machine. The most effective method for reducing the scale of the whole system is, for example, to raise a rotational speed. In most cases, a rotational speed of an ordinary compressor system is that of a constant-speed machine, so that the rotational speed ranges from 1500 to 3600 rpm. To drastically reduce the system scale, it is needed to raise the rotational speed to about tens of thousands of rpm. Also, the speed-up of a rotating electrical machine for driving allows to eliminate a gearbox (speed-up gear) and to directly connect a rotating shaft of the compressor to a rotor of the rotating electrical machine.

When attempting the speed-up of a rotating electrical machine, a restriction is imposed, for example, on the size of a rotor diameter. Usually, dimensions of a rotor diameter and a shaft length are determined so that there is no problem with cooling and shaft vibration. However, the speed-up provides less flexibility to select the dimension of the rotor diameter. That is, the dimension of the rotor diameter has to be determined so that a circumferential velocity of the rotor does not exceed the sonic speed. Accordingly, if output power is increased, the shaft length is made long for that purpose. That is, a constitution of a rotating electrical machine having a higher rotational speed is inevitably made long in the axial direction. A problem caused when making long is a temperature distribution generated within the rotating electrical machine in the axial direction. Because a peak temperature is particularly generated near the center in the axial direction, it is necessary to positively cool a place near the center in the axial direction, thereby leveling the temperature distribution.

For cooling such an elongated, rotating electrical machine, various constructions thereof have been studied, and for example see JP-A-2013-090412, JP-A-2010-166816 and JP-A-2013-074654.

JP-A-2013-090412 discloses a construction in which a refrigerant blown from an axial flow fan within a rotating electrical machine provides a plurality of ventilation ducts disposed in a stator core in an axial direction, and a heat exchanger of the refrigerant and the stator core are held by a pressing plate so as to control the refrigerant to pass through an air gap between the stator pressing plate and a stator frame.

JP-A-2010-166816 discloses a construction in which a flow rate of a refrigerant is increased near the center in an axial direction by increasing the number of ventilation ducts disposed in a stator core, at the center in the axial direction and narrowing a distance between the ventilation ducts.

JP-A-2013-074654 discloses a construction in which ventilation paths having grooves of different depths from each other are formed on an outside diameter side of a stator core by laminating laminated steel plates in an axial direction, the plates of the stator core having different outside diameters from each other, and a ventilation duct is disposed in the axial direction of the stator core.

SUMMARY OF THE INVENTION

JP-A-2013-090412 is characterized in that a flow rate of a refrigerant flowing to a ventilation duct of the stator and a gap portion between a rotor and a stator is increased by controlling the flow rate of the refrigerant flowing to an outside diameter side of the stator. This structure increases the flow rate of the refrigerant flowing to the ventilation duct, but it is difficult to increase the flow rate near the center in the axial direction.

JP-A-2010-166816 is characterized in that the total number of ventilation ducts in the axial direction of the stator is increased and a distance between the ventilation ducts is changed. The adopted structure is usable for cooling a place near the center in an axial direction because a flow rate of a refrigerant that flows in the axial direction and then in a diameter direction can be adjusted by changing the number of the ventilation ducts and a width of the ventilation duct. However, when a flow direction of the refrigerant is converted from the axial direction to the diameter direction, ventilation resistance is largely changed due to the shape of an inflow port. Even if the flow rate to the center in the axial direction is increased, the ventilation resistance becomes large due to the shape of the inflow port in JP-A-2010-166816 and the flow rate of the refrigerant may become insufficient to lower temperature.

In JP-A-2013-074654, level differences are provided in a ventilation path on an outside diameter side of a stator by using electromagnetic steel sheets having different outside diameters to laminate on the stator. This suppresses a flow rate distribution of a refrigerant flowing in an axial direction generated by an effect of the flow rate of the refrigerant flowing in a diameter direction, and also efficiently cools the stator. In JP-A-2013-074654, the refrigerant flowing on an outside diameter side of the rotor is adjusted by the level differences. If the flow of the refrigerant is simply converted from the outside of ends of the stator to the axial direction, the level differences are not needed and an opening of an inflow port may be widened. Accordingly, this scheme is not suitable for increasing the refrigerant flow rate at the center in the axial direction.

JP-A-2013-090412, JP-A-2010-166816 and JP-A-2013-074654 cannot allow an elongated rotating electrical machine to be sufficiently cooled near the center in an axial direction.

One object of the invention is to provide a rotating electrical machine system in which a refrigerant flow rate in an elongated, rotating electrical machine is increased near the center in an axial direction, so that a cooling efficiency is improved.

To achieve the object described above, in one example of the invention, a rotating electrical machine is a rotating electrical machine including a rotor and a stator, wherein
the stator includes a coil and a stator core,
the coil is disposed in a circumferential direction of the stator,
in the stator core, laminated electromagnetic steel sheets formed by laminating a plurality of electromagnetic steel sheets in an axial direction are divided into a plurality of sets of packet cores, and between one of the packet cores of the plurality of sets and an adjacent, other packet core, there is formed a duct providing a flow channel to cause a refrigerant to flow in a diameter direction of the stator, the packet core and the duct are configured to be alternately arranged, and the duct is configured so that a cross-sectional area of the flow channel on an inflow side of the refrigerant is larger than that on an outflow side.

According to the invention, it becomes possible to improve cooling efficiency near the center in an axial direction of an elongated rotating electrical machine.

Other objects, features and advantages of the invention will become apparent from the following description of the embodiments of the invention taken in conjunction with the accompanying drawings.

DESCRIPTION OF THE EMBODIMENTS

Details of the invention are hereinafter described using drawings. In each of figures, a similar part is indicated by an identical number.

Embodiment 1

Figure 1:
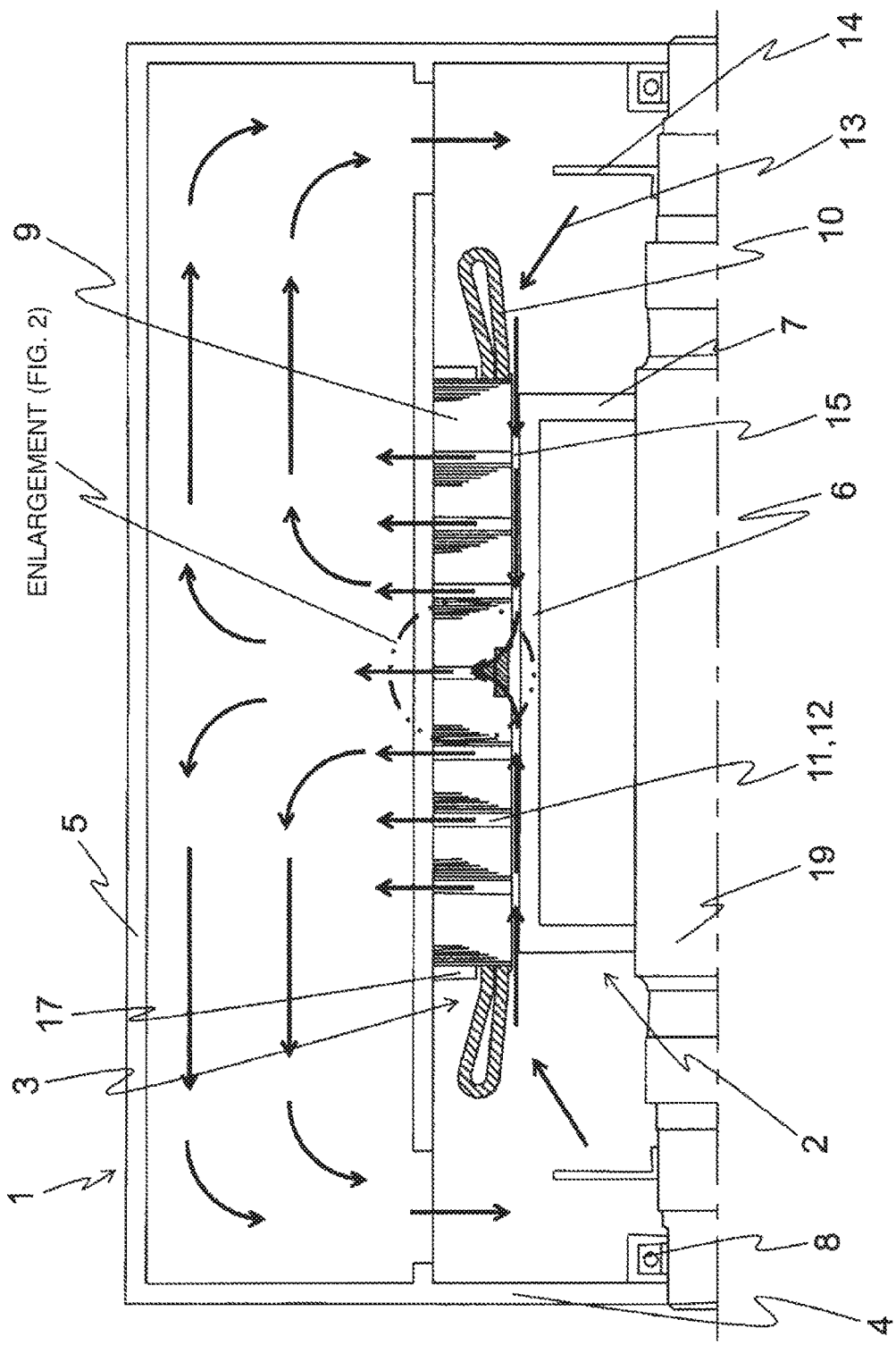
FIG. 1 is an illustration for showing implementation method of a rotating electrical machine (embodiment 1)

FIG. 1 is a cross-sectional view of a rotating electrical machine configuring a first embodiment of a device according to the invention. The rotating electrical machine is mainly used in a compressor system for refining oil and a natural gas. This is a rotating electrical machine having output power of several MW and a rotational speed of tens of thousands of rpm. This rotating electrical machine is applied in a limited installation space, such as on the ocean because a system scale thereof can be reduced due to the benefits of raising the rotational speed.

Main components for configuring the rotating electrical machine 1, as shown in FIG. 1, include a rotor 2, a stator 3, a frame 4 and a heat exchanger 5. The rotor 2 includes an iron core 19 integrated with a shaft, a copper bar 6 and an end ring 7, and is supported by a bearing 8, thus rotating.

The stator 3 is formed by providing electromagnetic steel sheets 9 with a coil 10 and fastened to the frame 4. For a construction in an axial direction, a duct 12 for forcing a refrigerant 13 to flow is formed by providing a duct piece 11 between laminated electromagnetic steel sheets 9, and the electromagnetic steel sheets 9 and the duct piece 11 are alternately disposed. A core clamp 17 is attached to both ends of the stator 3 in the axial direction, the core clamp being for applying a surface pressure so that the electromagnetic steel sheets 9 are held together and do not separate.

Next, a flow of the refrigerant is described. The flow of the refrigerant 13 is sent by a fan 14 to a gap 15 formed between the rotor 2 and the stator 3. The refrigerant 13 having flowed into the gap 15 passes through the duct 12 formed in the stator 3 and flows to the heat exchanger 5. The refrigerant 13 returns to the fan 14 from the heat exchanger 5 again, so that the refrigerant 13 circulates inside the rotating electrical machine 1.

Figure 2:
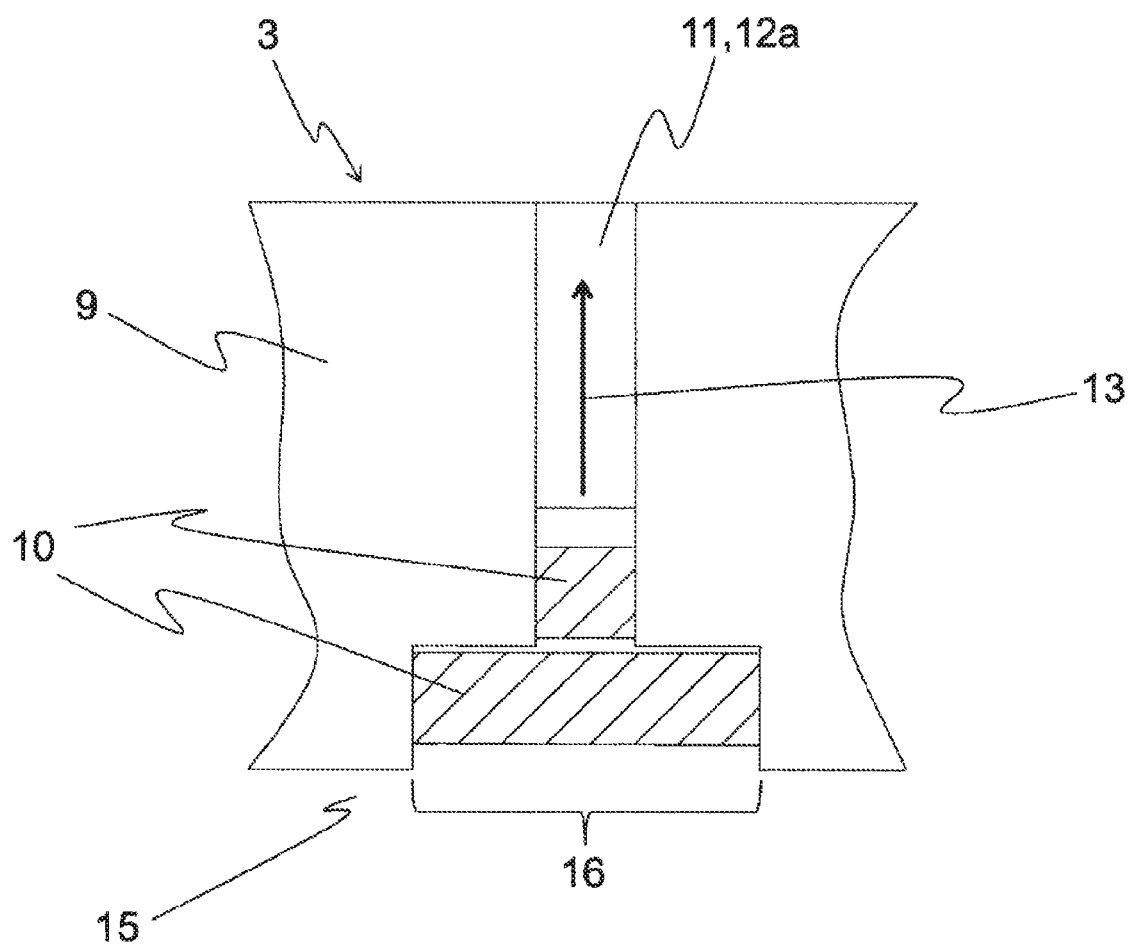
FIG. 2 is an illustration for showing the implementation method of the rotating electrical machine (embodiment 1)

Here, an enlarged figure of a duct 12a situated at the central portion in the axial direction of the stator 3 is illustrated in FIG. 2. As shown in FIG. 2, an inflow port 16 of the duct 12a from the gap 15 is made large. The enlarged inflow port 16 allows ventilation resistance to be reduced and the flow rate of the refrigerant 13 to be increased. Also, the exposed portion of the coil 10 is increased, and accordingly an area coming in contact with the refrigerant 13 is increased, so that temperature of the coil 10 can be lowered.

That is, expanding the inflow port only near the center in the axial direction allows ventilation resistance to be reduced, the refrigerant flow rate to be increased and a peak temperature at the center in the axial direction to be lowered. Also, an area of the coil coming in contact with the refrigerant is increased, so that the temperature of the coil can be lowered.

Figure 3:
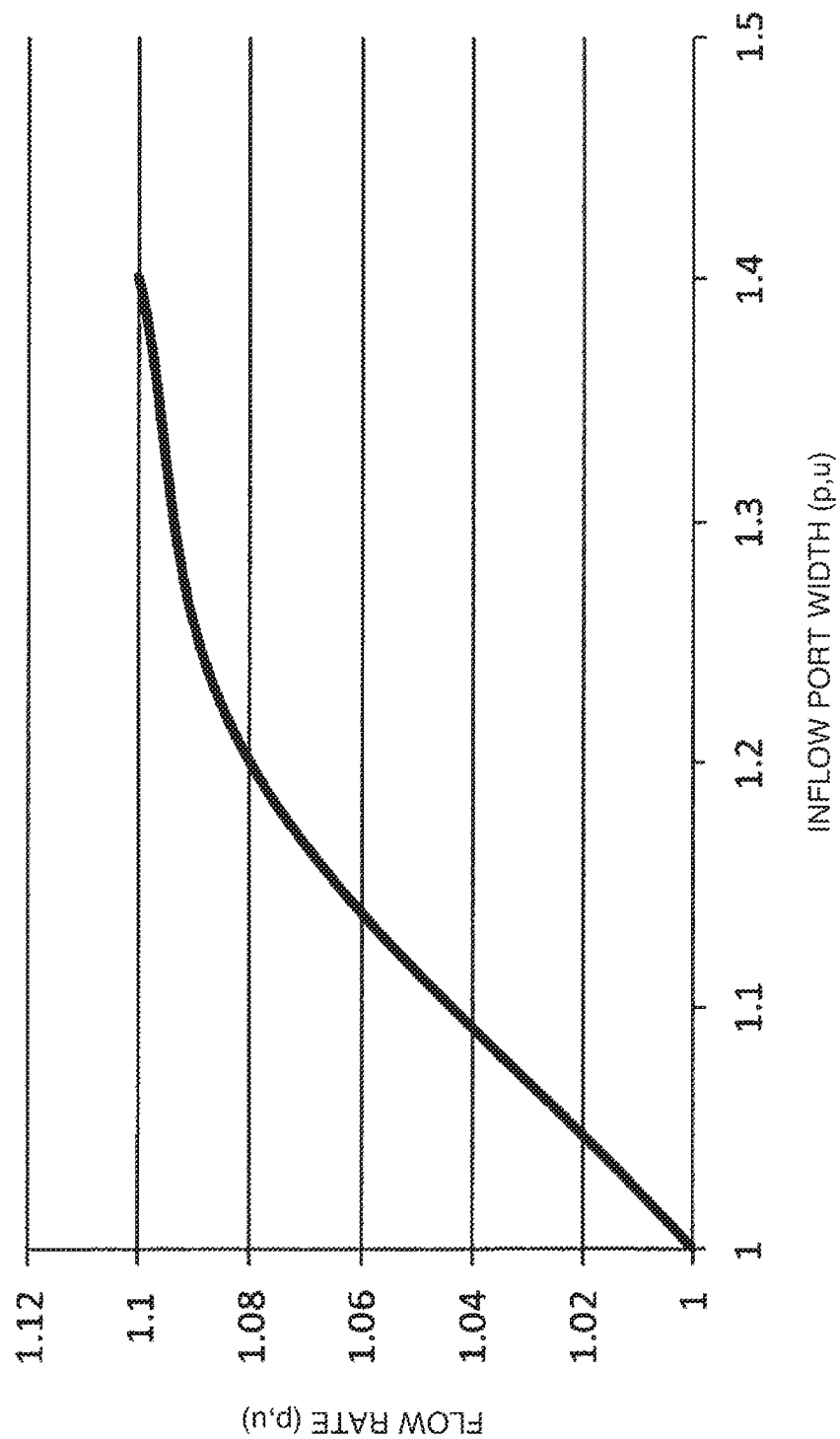
FIG. 3 is an illustration for showing the relation between the size of an inflow port and a flow rate (embodiment 1)

Next, the relation between the size of the inflow port 16 and an increase in flow rate is shown in FIG. 3. As shown in FIG. 3, the horizontal axis represents a width of the inflow port and the vertical axis represents the flow rate, and in both axes, normalized values (p, u) are used, the normalized values being set to 1.0 when the inflow port is not made large (the width identical with that of the duct 12a). From FIG. 3, it is seen that widening the width of the inflow port by about 1.4 times allows the flow rate of the refrigerant 13 to be increased by about 10%.

In this embodiment, an example in which a temperature distribution in the axial direction becomes highest at the center in the axial direction is illustrated. Accordingly, as shown in FIG. 1, the duct 12a in which the inflow port 16 is made large is provided at the center in the axial direction, but it is not intended to limit to the center in the axial direction. Thus, it is suitable that a location where the inflow port 16 is made large is selected and located, depending on a position where a peak temperature in the axial direction occurs. This point is described in detail in an embodiment 3.

Figure 4:
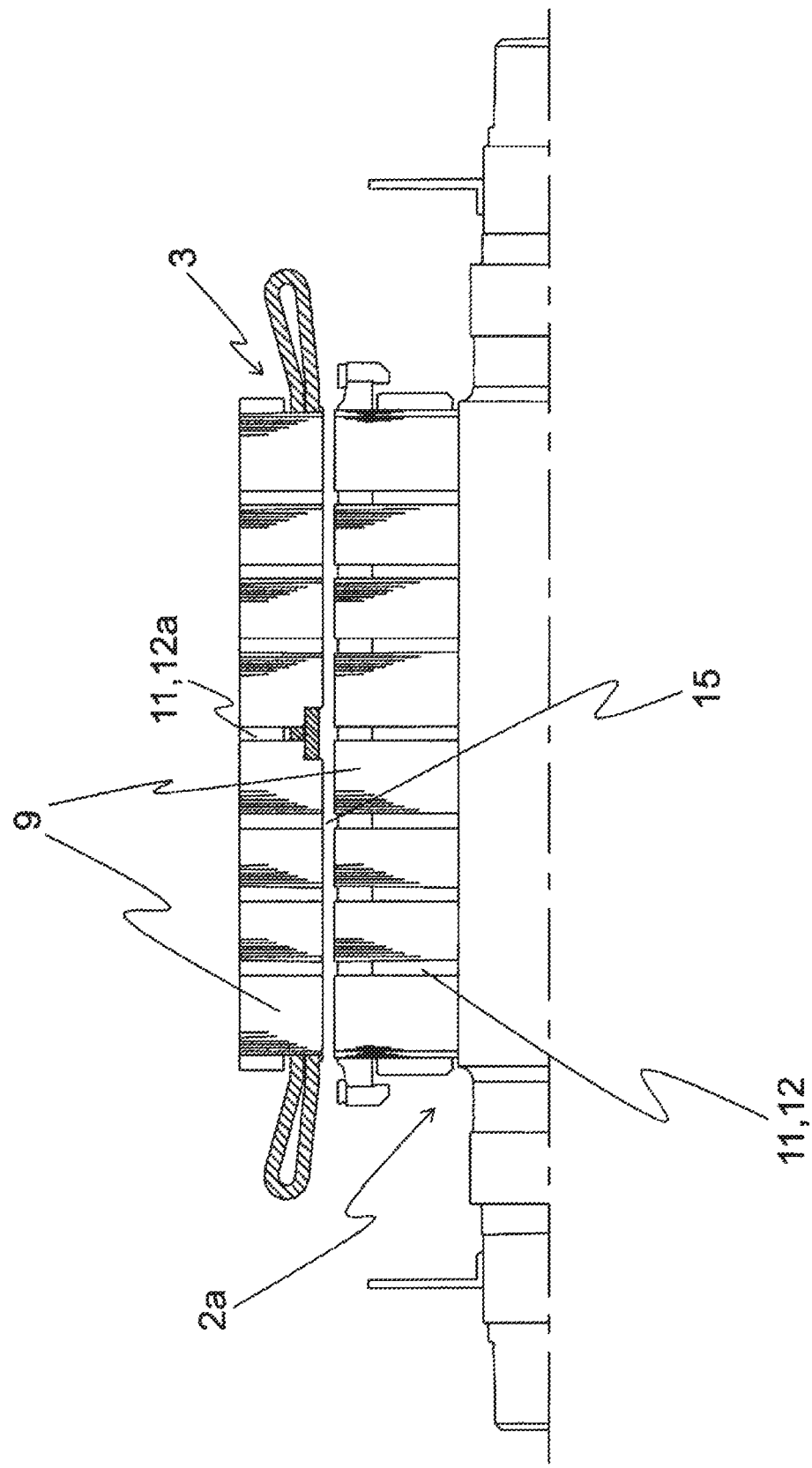
FIG. 4 is an illustration for showing the implementation method of the rotating electrical machine (embodiment 1)

Also, in this embodiment, the rotor 2 is a solid type rotor including the iron core 19 integrated with the shaft, the copper bar 6 and the end ring 7, but as shown in FIG. 4, even if, similar to the stator 3, a rotor 2a is configured by laminating the electromagnetic steel sheets 9 and using the duct piece 11, a similar effect can be offered. However, in the case of the solid type rotor, it is difficult to provide the rotor 2 with the duct piece 11.

Accordingly, there is no flow of the refrigerant 13 from the rotor 2, so that a flow channel path of the refrigerant 13 to cool the inside of the stator is only the gap 15 and the duct 12. From this point, it may be said that the invention is more effective when applied to the solid type rotor. Furthermore, the rotating electrical machine is anticipated to be an induction machine, but for a synchronous machine or a permanent magnetic synchronous machine, a similar effect can be provided.

Also, instead of the winding method of the coil 10 applied to the stator 3, distributed winding or concentrated winding can be used without problem. Also, the bearing 8 is a ball bearing in this embodiment, but other bearings or a magnetic bearing for matching the speed-up can be applied without problem.

By adopting the configuration described above, it becomes possible to increase the refrigerant flow rate at a location where the maximum temperature occurs near the center in the axial direction of the rotating electrical machine, to lower the temperature, and to level the temperature distribution.

Embodiment 2

Figure 5:
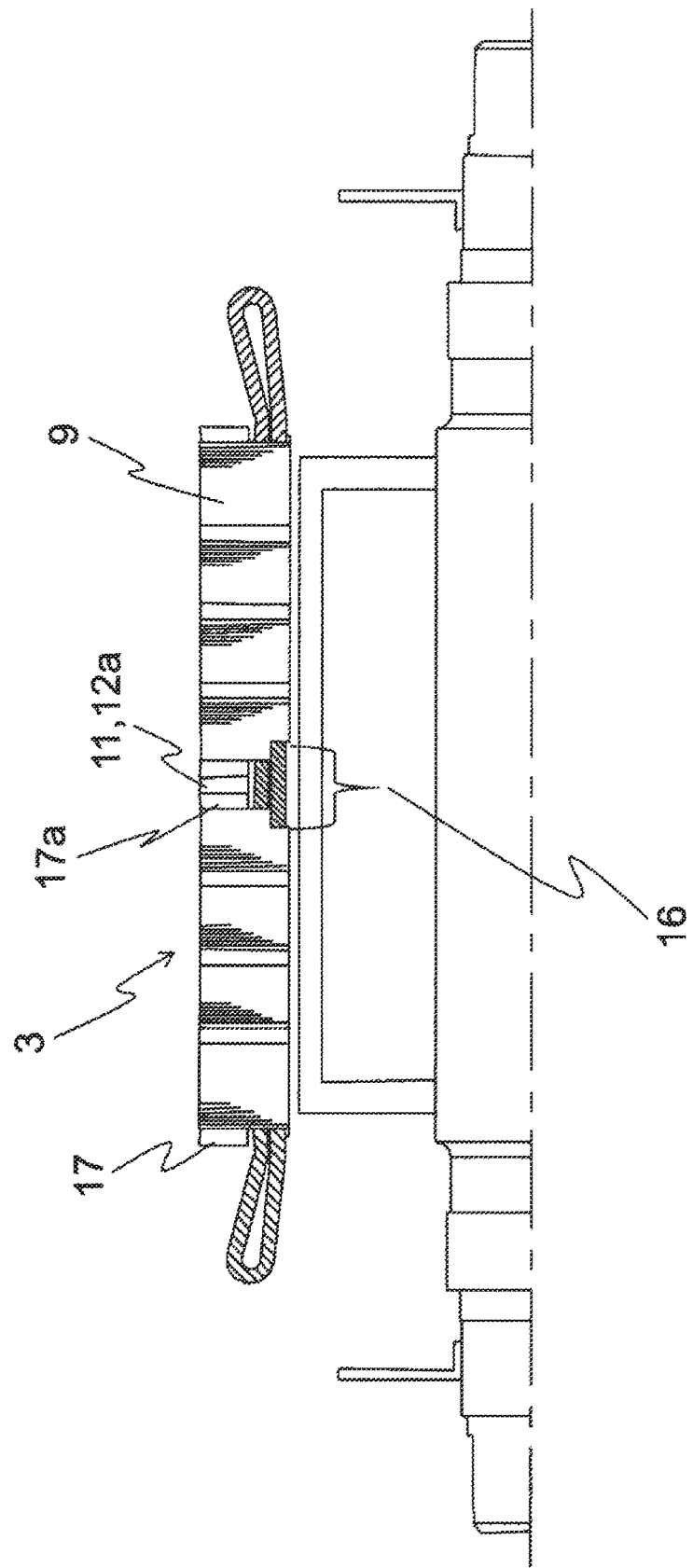
FIG. 5 is an illustration for showing an implementation method of the rotating electrical machine (embodiment 2)

FIG. 5 is a cross-sectional view of a rotating electrical machine configuring an embodiment 2 according to the invention. As shown in FIG. 5, in the configuration shown in the embodiment 1, the duct 12a formed in the stator 3 is provided with a core clamp 17a.

The core clamp 17 provided on ends of the stator 3 and the core clamp 17a provided in the duct 12a apply a surface pressure to the laminated electromagnetic steel sheets 9. When a shaft length of the rotating electrical machine becomes long, it is possible that it becomes difficult to uniformly apply the surface pressure to the laminated electromagnetic steel sheets 9, the stator 3 itself has a lower rigidity and vibration and noises become large.

If the shaft length becomes extremely long, then as in this embodiment, the rigidity can be ensured by providing the core clamp 17a between the ducts 12a, and, instead of to both ends of the stator 3, applying the surface pressure to an intermediate portion where the shaft length is short.

Also, the inflow port 16 can be made large by the thickness of the core clamp 17a, by providing the duct 12a with the core clamp 17a, so that the effect of the embodiment 1 can be more enhanced.

Embodiment 3

Figure 6:
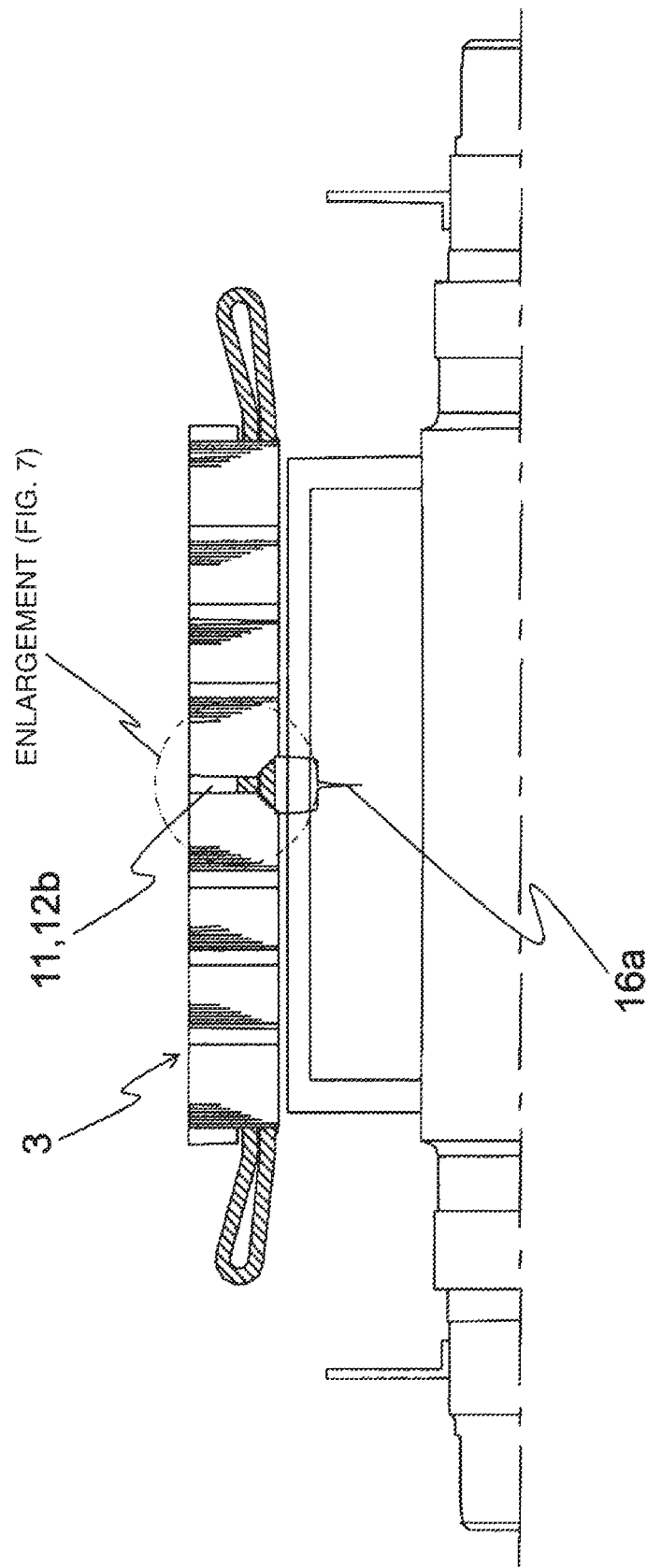
FIG. 6 is an illustration for showing an implementation method of the rotating electrical machine (embodiment 3)

FIG. 6 is a cross-sectional view of a rotating electrical machine configuring an embodiment 3 according to the invention. As shown in FIG. 6, in the configurations shown in the embodiment 1 and the embodiment 2, the shape of an inflow port 16a of a duct 12b provided in the stator 3 is gradually expanded toward both ends in the axial direction.

Figure 7:
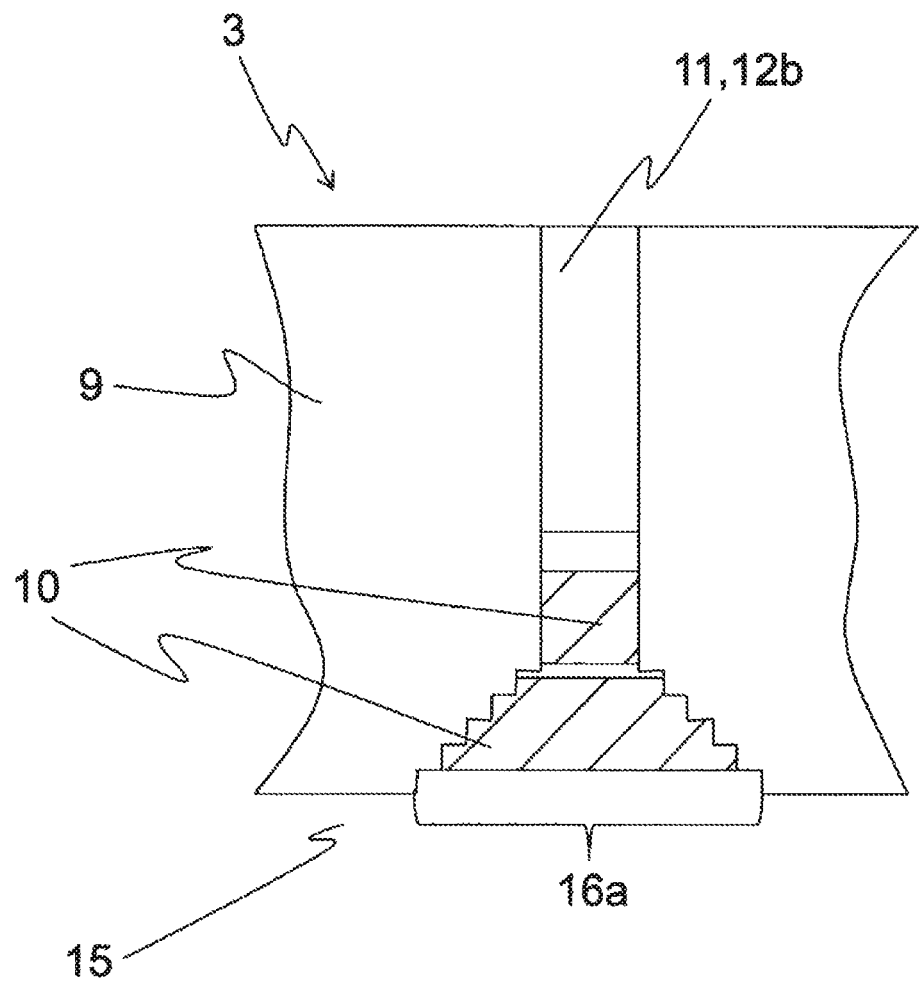
FIG. 7 is an illustration for showing the implementation method of the rotating electrical machine (embodiment 3)

An enlarged view of the duct 12b is shown in FIG. 7. As shown in FIG. 7, the electromagnetic steel sheets 9 for constituting the stator 3 are laminated with an inside diameter of the electromagnetic steel sheets 9 being increased toward both ends in the axial direction. Taking such a shape allows ventilation resistance of the flow flowing into the duct 12b from the gap 15 to be reduced. Essentially, providing a corner of the inflow port 16a with a curve is thought to be best, but it becomes difficult to work in the case of a large-scaled stator 3 because the electromagnetic steel sheets 9 are laminated, the stator 3 is fabricated and subsequently machine processing is carried out.

Also, a surface formed by lamination is worked, so that a burr of the electromagnetic steel sheets 9 may occur, and an insulating layer may be removed.

As in this embodiment, the burr of the electromagnetic steel sheets 9 and the removal of the insulating layer can be prevented by carrying out punching before laminating the electromagnetic steel sheets 9 and forming the gradually expanding construction (level differences construction) of the inflow port 16a, thereby providing the same effect as in the case of the curved corner.

Figure 8:
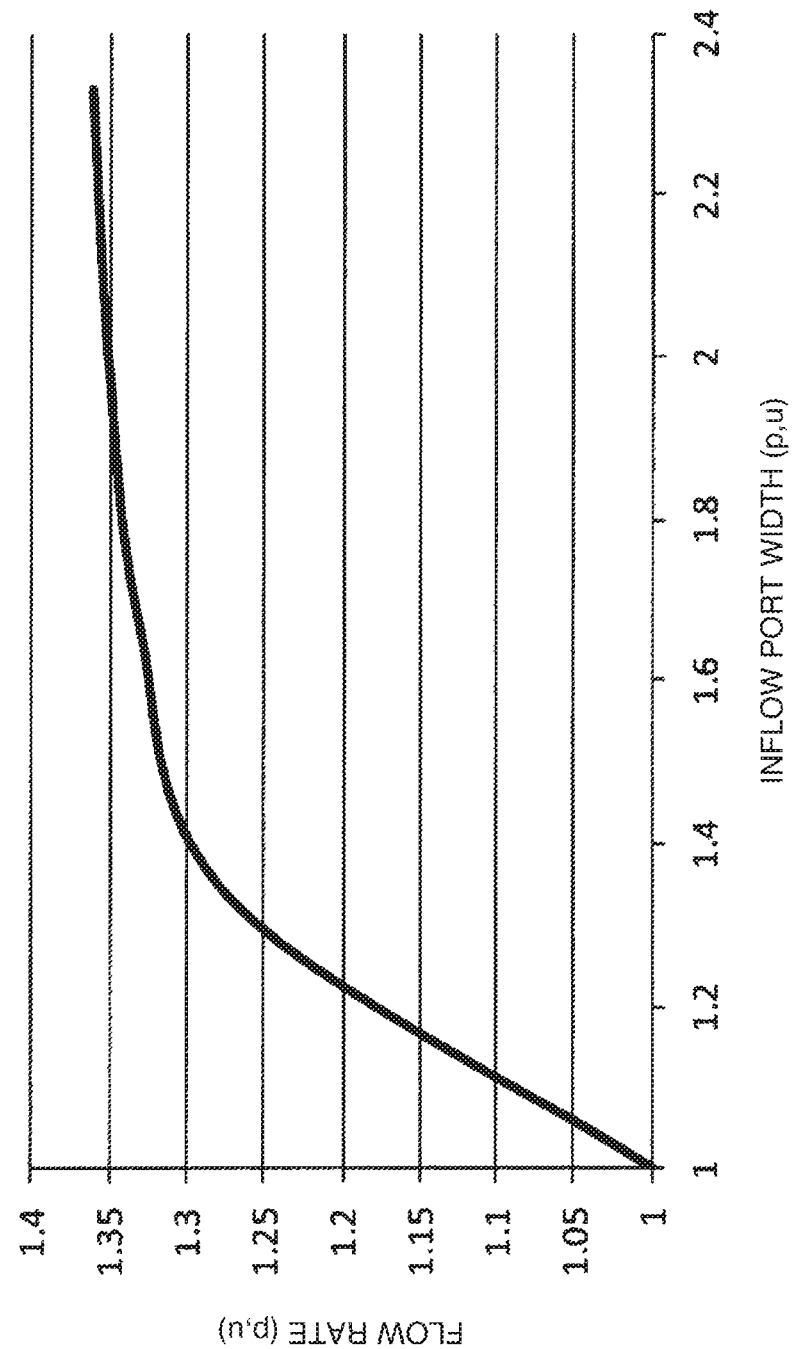
FIG. 8 is an illustration for showing the relation between the size of the inflow port and the flow rate (embodiment 3)

The relation between the size of the inflow port 16a in the case of the gradual expansion and an increase in flow rate is shown in FIG. 8. As shown in FIG. 8, the horizontal axis represents the width of the inflow port and the vertical axis represents the flow rate. In both axes, normalized values (p, u) are used, the normalized values being set to 1.0 when the inflow port is not made large (the width identical with that of the duct 12b) and is not gradually expanded.

From FIG. 8, it is seen that if the width of the inflow port is made about 1.4 times larger, the flow rate of the refrigerant 13 is increased about 1.3 times greater. In the FIG. 3 of the embodiment 1, if the inflow port, from the state of the enlarged inflow port, is gradually made small (when the inflow port is seen from the inside diameter side of the stator), then the flow rate can be increased by about 1.18 times. From this point, it is seen that the shape of the inflow port has a huge effect on the flow rate.

Figure 9:
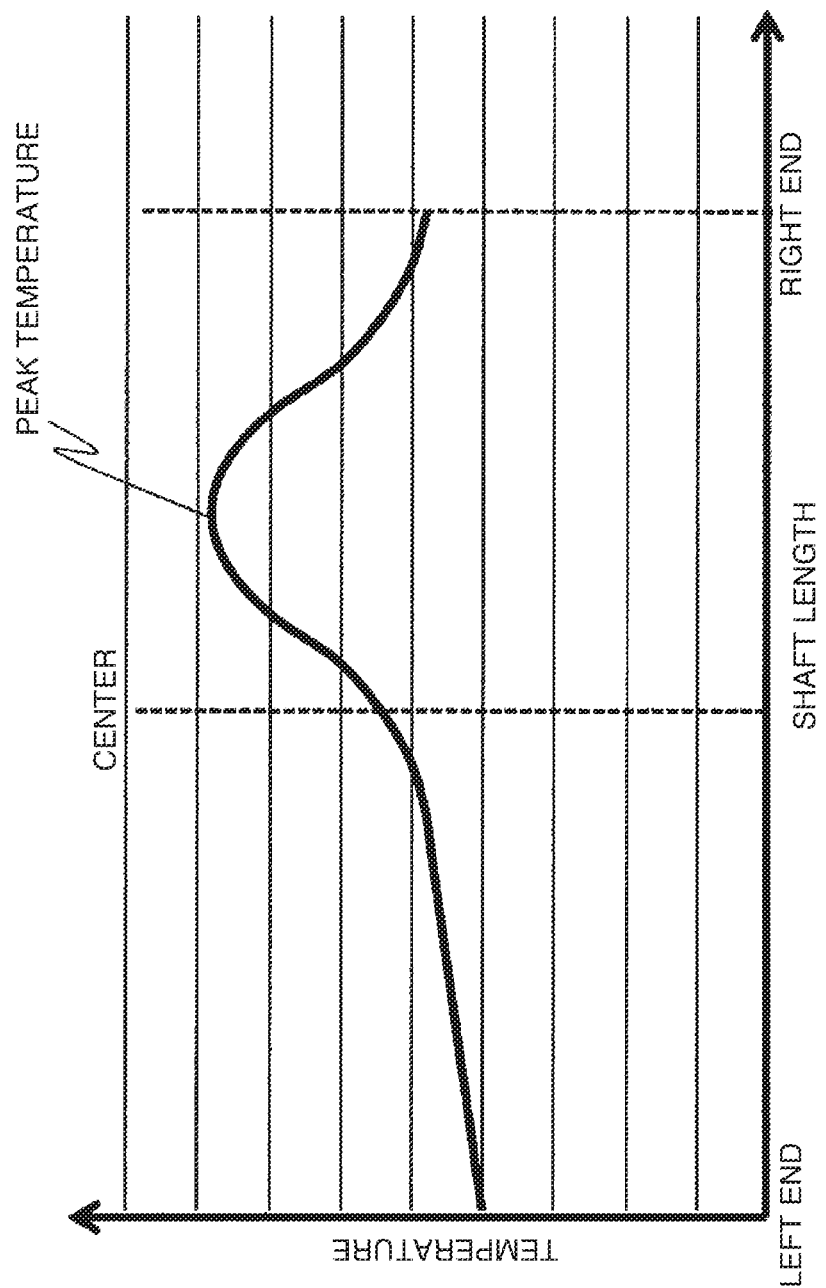
FIG. 9 is an illustration for showing the relation between the length in an axial direction and a coil temperature (embodiment 3)
Figure 10:
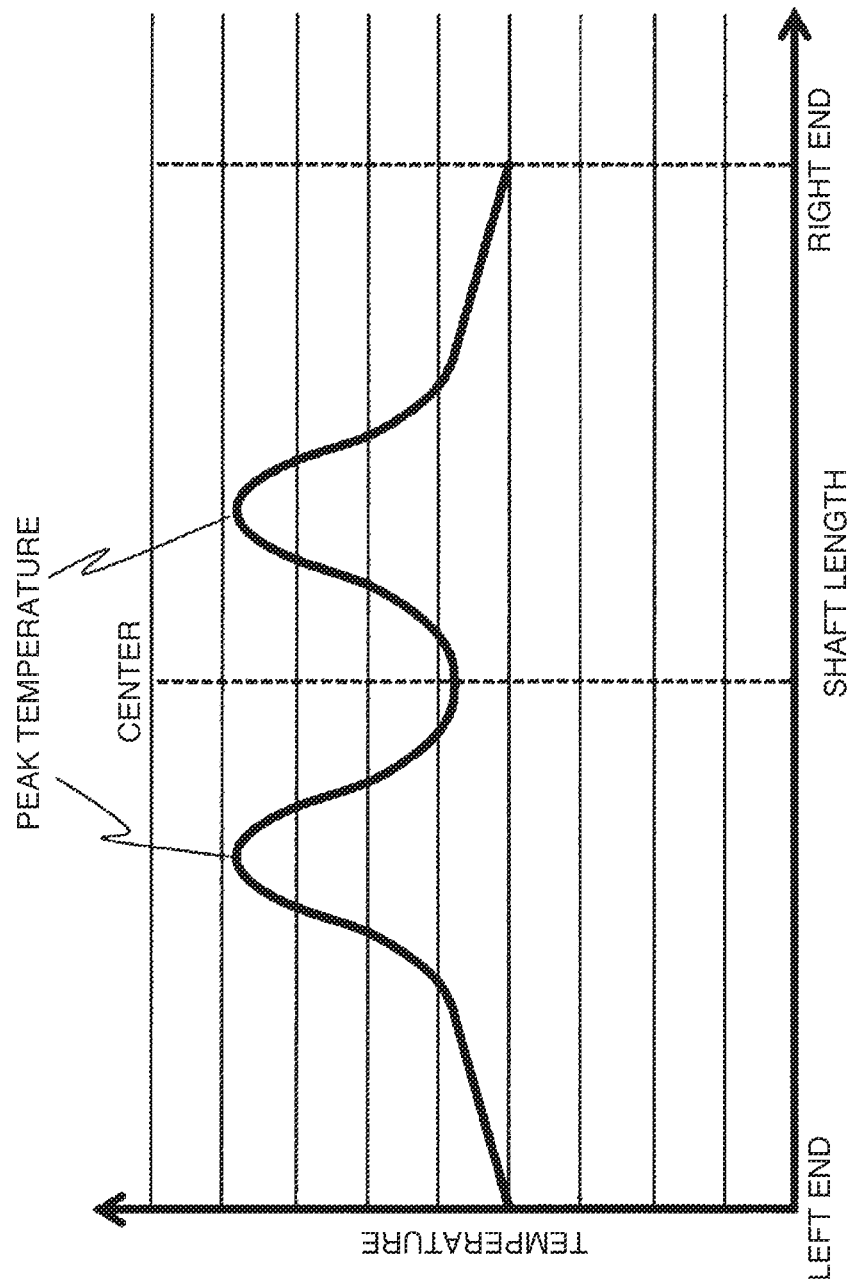
FIG. 10 is an illustration for showing the relation between the length in the axial direction and the coil temperature (embodiment 3)

A position of the inflow port 16a in the axial direction, provided in the stator 3 is described. FIGS. 9 and 10 show a temperature distribution of the coil 10 in the axial direction. In FIG. 9, a position where a peak temperature occurs is a position slightly shifted to the right from the center of the shaft length. In FIG. 10, the position where the peak temperature occurs is a position on the sides of the center of the shaft length.

Figure 11:
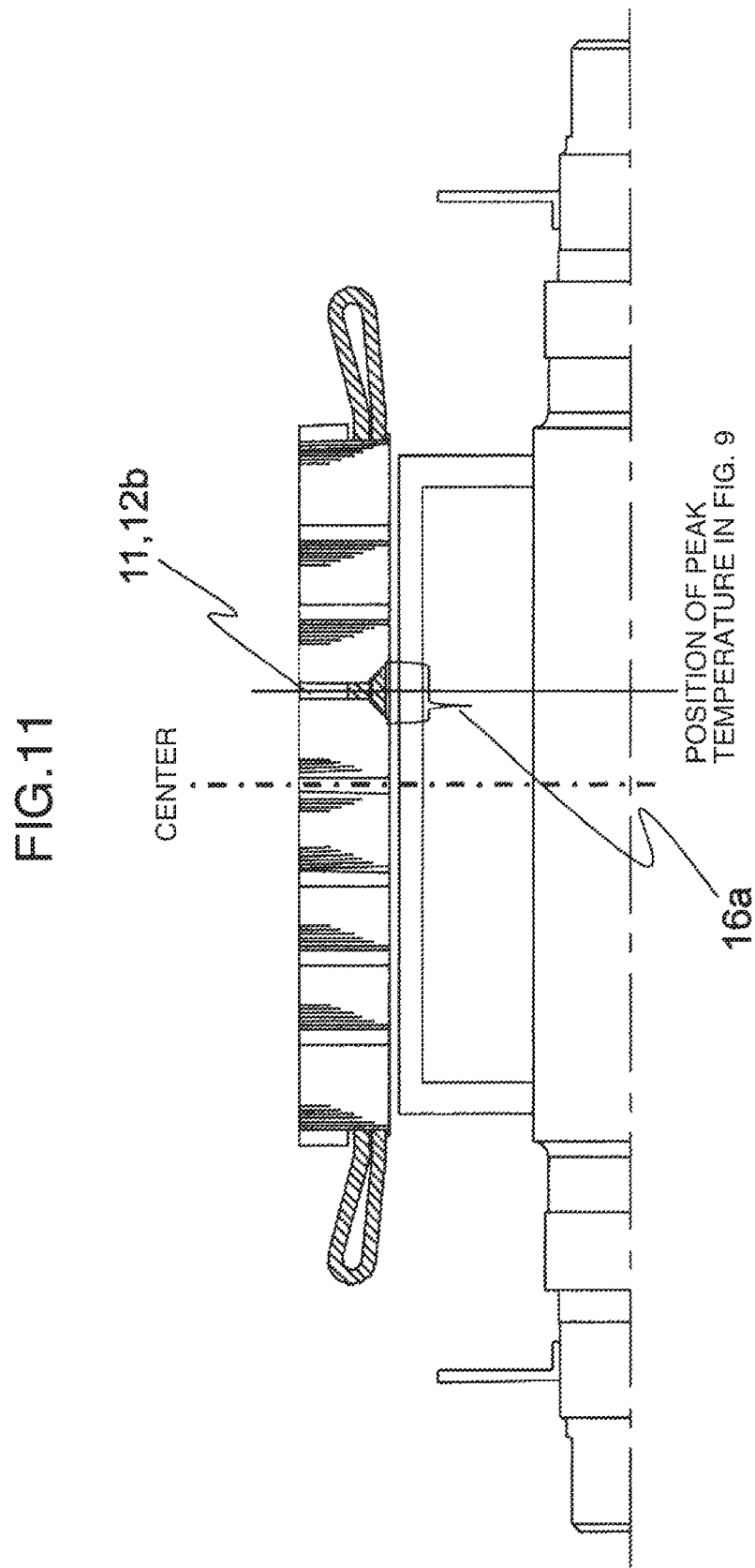
FIG. 11 is an illustration for showing the implementation method of the rotating electrical machine (embodiment 3)
Figure 12:
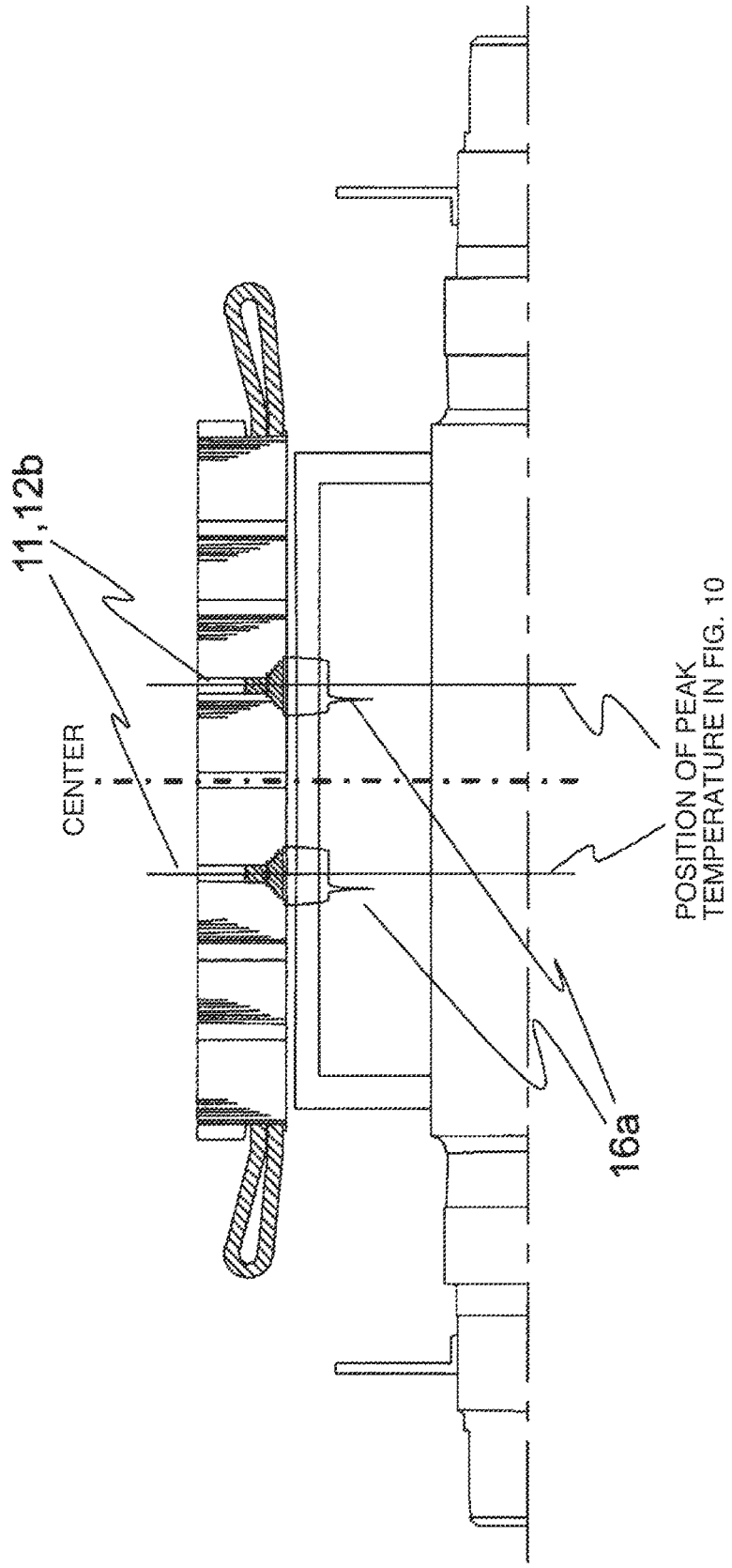
FIG. 12 is an illustration for showing the implementation method of the rotating electrical machine (embodiment 3)

FIGS. 11 and 12 show placement of the inflow port 16a, corresponding to the temperature distribution shown in FIGS. 9 and 10. In FIG. 11, the inflow port 16a is located to match the position slightly shifted to the right from the center of the shaft length. In FIG. 12, the inflow ports 16a are located on the sides of the center of the shaft length.

From this point, it is suitable that the inflow port 16a is located to match the position where the peak temperature occurs. Also, as shown in FIG. 12, a plurality of the inflow ports 16a may be provided. Next, a position of the inflow port 16a in the diameter direction is described. In FIG. 1 to FIG. 12, in the all cases, the enlarged inflow port 16, 16a is provided on the inside diameter side of the stator 3, but in FIG. 13, the inflow port 16b is provided on the outside diameter of the stator 3.

Figure 13:
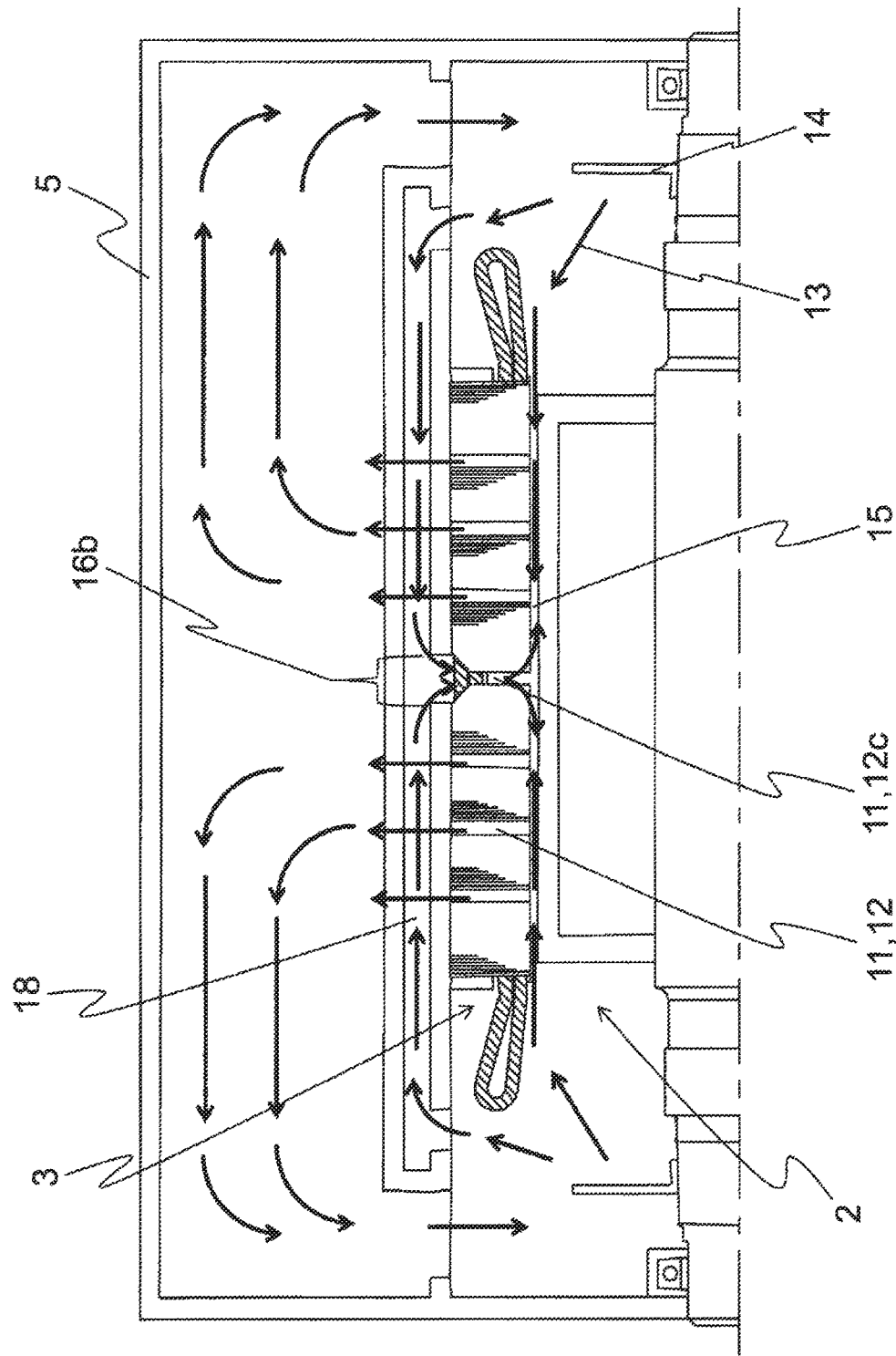
FIG. 13 is an illustration for showing the implementation method of the rotating electrical machine (embodiment 3)

A flow of the refrigerant in FIG. 13 is described. The flow of the refrigerant 13 is sent by the fan 14 to the gap 15 formed between the rotor 2 and the stator 3, and a bypass flow channel 18 situated on the outside diameter side of the stator 3. The refrigerant 13 having flowed to the gap 15 passes through the duct 12 formed in the stator 3 and flows to the heat exchanger 5. The refrigerant 13 returns from the heat exchanger 5 to the fan 14 again and circulates.

On the one hand, the refrigerant 13 having flowed to the bypass flow channel 18 directly flows to the inflow port 16b of a duct 12c formed in the stator 3. The refrigerant 13 having flowed to the inflow port 16b flows to the gap 15 and joins the refrigerant 13 having directly flowed to the gap 15. Such a flow channel formation allows the refrigerant 13 having a low temperature to directly flow to the central portion of the stator 3 in the axial direction.

By providing the inflow port 16b for the refrigerant 13 having directly flowed, the ventilation resistance can be reduced and the flow rate can be increased. From this point, the inflow port 16b may be located on the inside diameter side and the outside diameter side of the stator 3 so as to match the refrigerant flow channel. Also, if the inflow port 16b is located on the outside diameter side of the stator 3, then, as described above, a plurality of the inflow ports may be provided.

Embodiment 4

Figure 14:
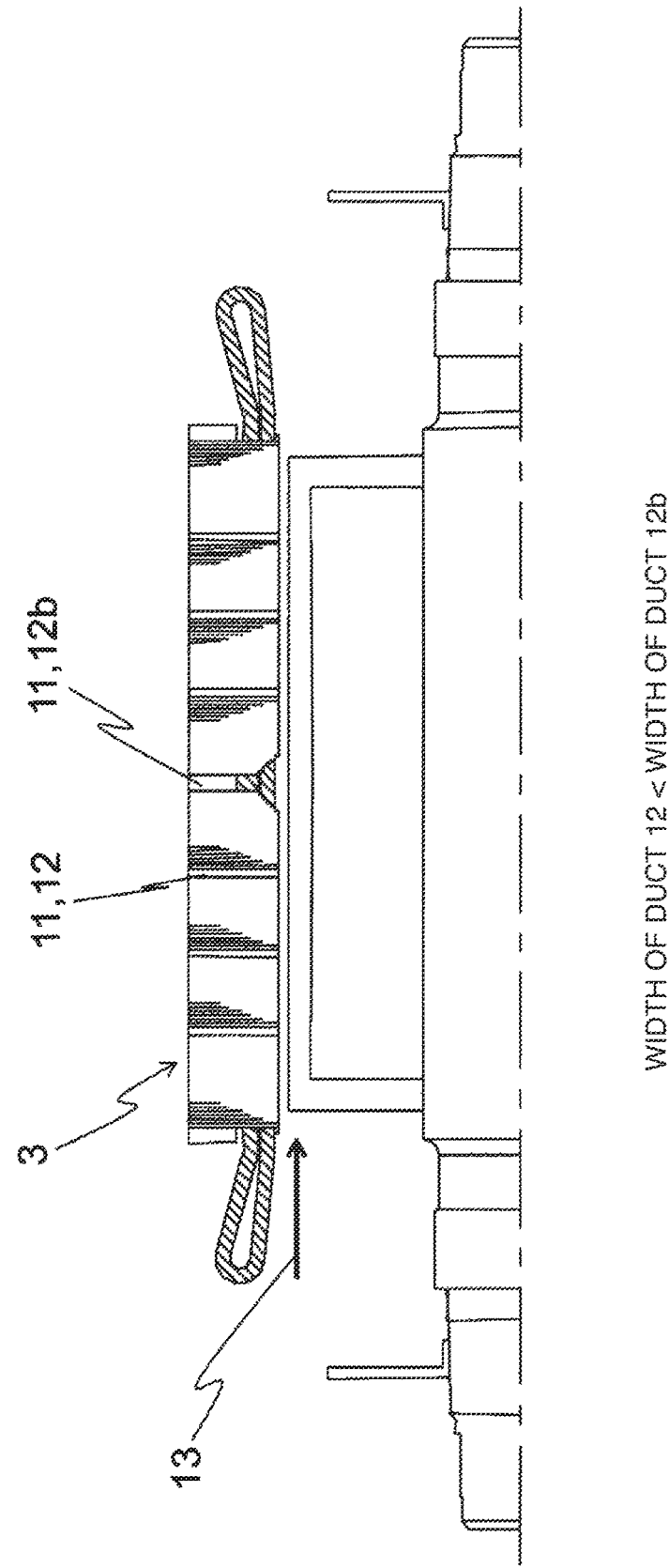
FIG. 14 is an illustration for showing an implementation method of the rotating electrical machine (embodiment 4)

FIG. 14 is a cross-sectional view of a rotating electrical machine configuring an embodiment 4 according to the invention. As shown in FIG. 14, in the configurations shown in the embodiments 1 to 3, the width of the duct 12 disposed in the stator 3 is made smaller than that of the duct 12b. Accordingly, the flow rate of the refrigerant 13 flowing to the duct 12b can be increased and the peak temperature can be lowered.

Embodiment 5

Figure 15:
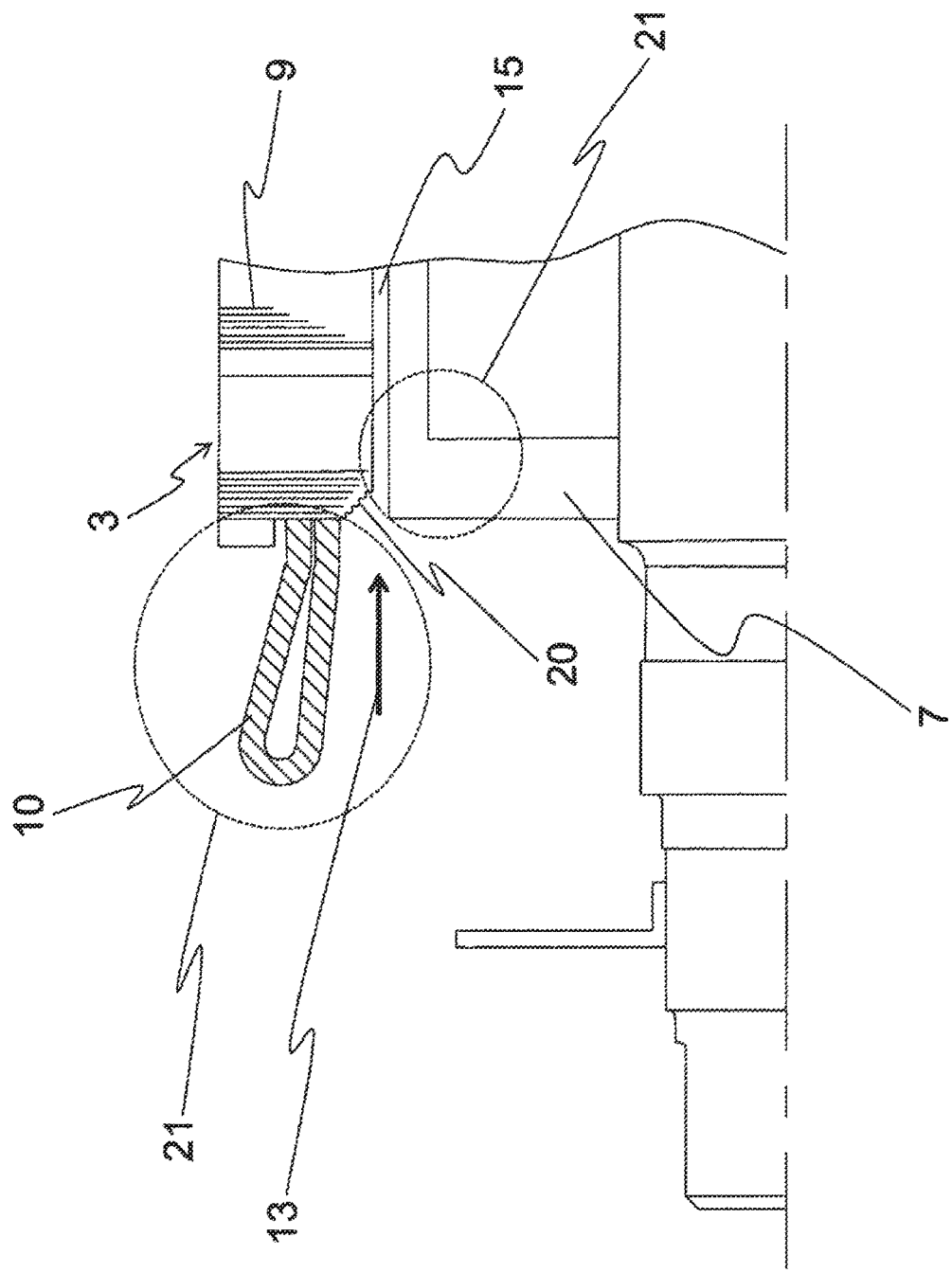
FIG. 15 is an illustration for showing an implementation method of the rotating electrical machine (embodiment 5)

FIG. 15 is a cross-sectional view of a rotating electrical machine configuring an embodiment 5 according to the invention. As shown in FIG. 15, in the configurations shown in the embodiments 1 to 4, the inside diameter of the electromagnetic steel sheets 9 of the stator 3 at both ends is gradually increased from the center in the axial direction toward both ends (gradually increased portion 20).

Because, in this way, the ventilation resistance at the inflow port of the gap 15 can be reduced, the refrigerant 13 easily flows to the gap 15. Also, as shown in FIG. 15, a leakage flux 21 flows from the coil 10 and the end ring 7 into the air. The leakage flux 21 is generated by an alternating current, so that the flux itself will alternate.

Ends of the stator 3, as indicated in FIG. 15, provide a path for the leakage flux 21, so that an eddy current flows in only ends of the electromagnetic steel sheets 9 due to the leakage flux 21, thus generating a loss. However, as in this embodiment, by taking a construction in which the ends are gradually expanded, an effect for reducing the eddy current at the ends can be provided and also the loss can be reduced.

Embodiment 6

Figure 16:
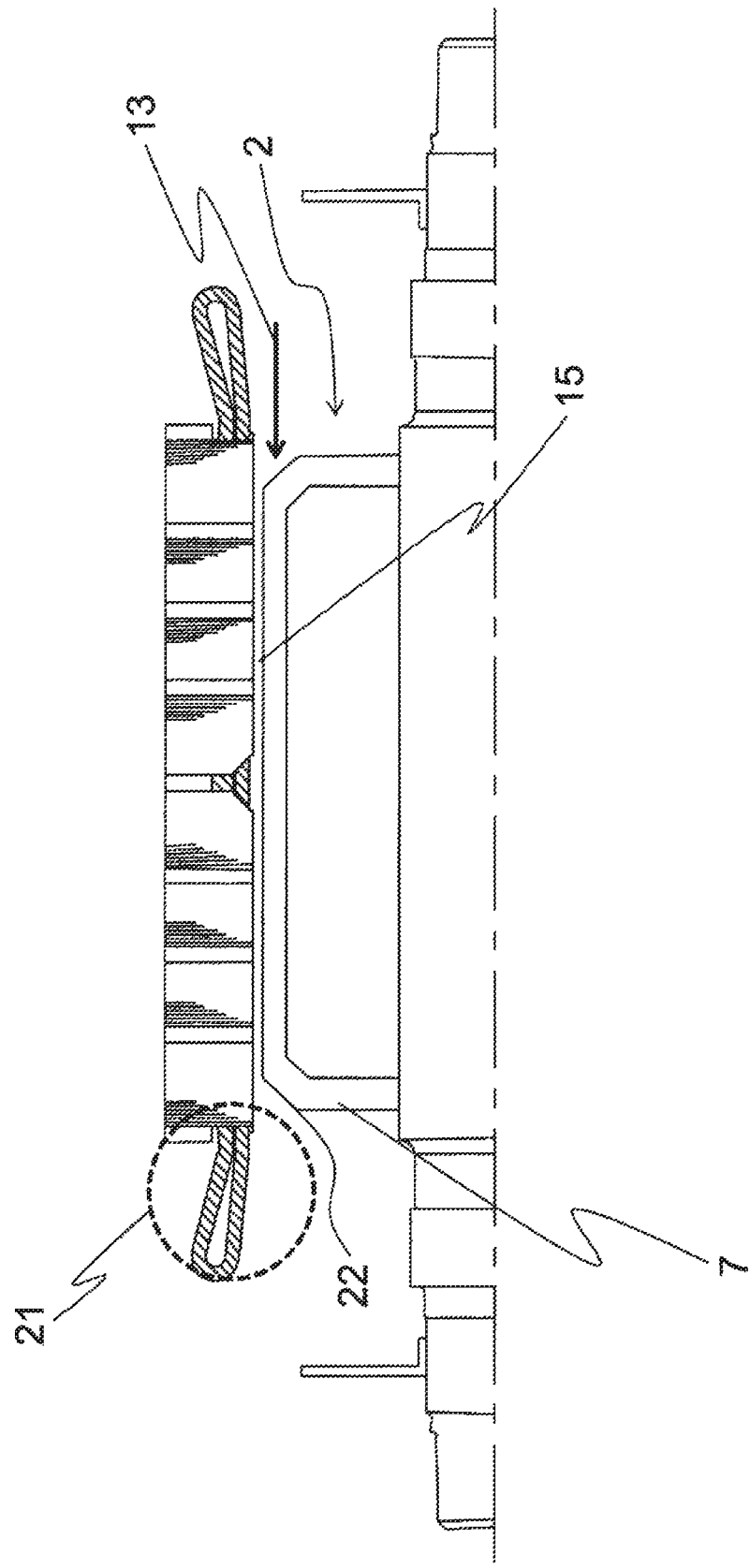
FIG. 16 is an illustration for showing an implementation method of the rotating electrical machine (embodiment 6)

FIG. 16 is a cross-sectional view of a rotating electrical machine configuring an embodiment 6 according to the invention. As shown in FIG. 16, in the configurations shown in the embodiments 1 to 5, an outside diameter of both ends of the end ring 7 of the rotor 2 is gradually increased from the center in the axial direction toward both ends (gradually increased portion 22).

Figure 17:
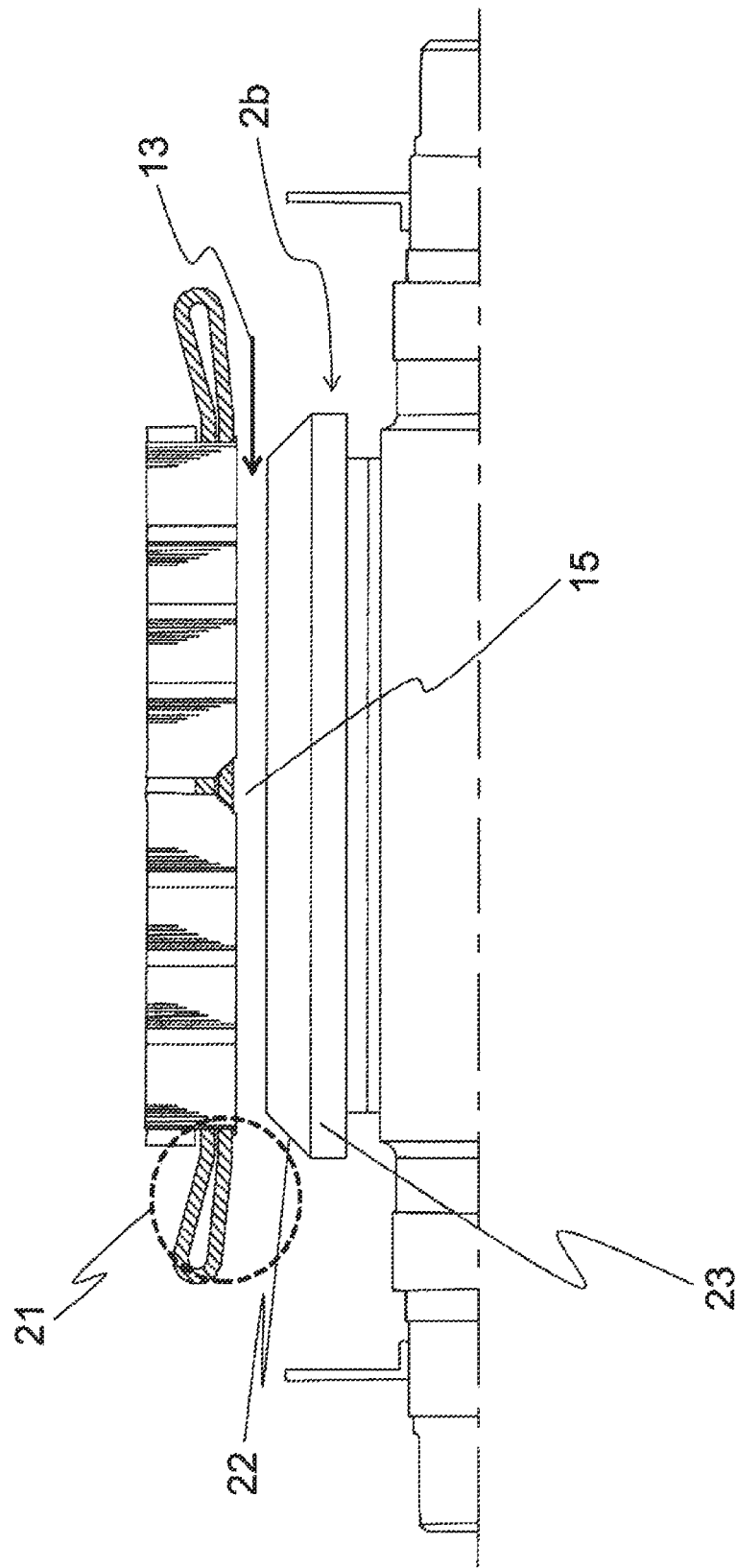
FIG. 17 is an illustration for showing the implementation method of the rotating electrical machine (embodiment 6)

Because, in this way, the ventilation resistance at the inflow port of the gap 15 can be reduced, the refrigerant 13 easily flows to the gap 15. In FIG. 17, the rotor 2b is anticipated to be a field winding synchronous machine. As shown in FIG. 17, a pole shoe 23 is configured to be made gradually large. In this way, fortunately, the refrigerant 13 easily flows and further the eddy-current loss due to the leakage flux 21 at the ends can be reduced, similar to the embodiment 5.

Embodiment 7

Figure 18:
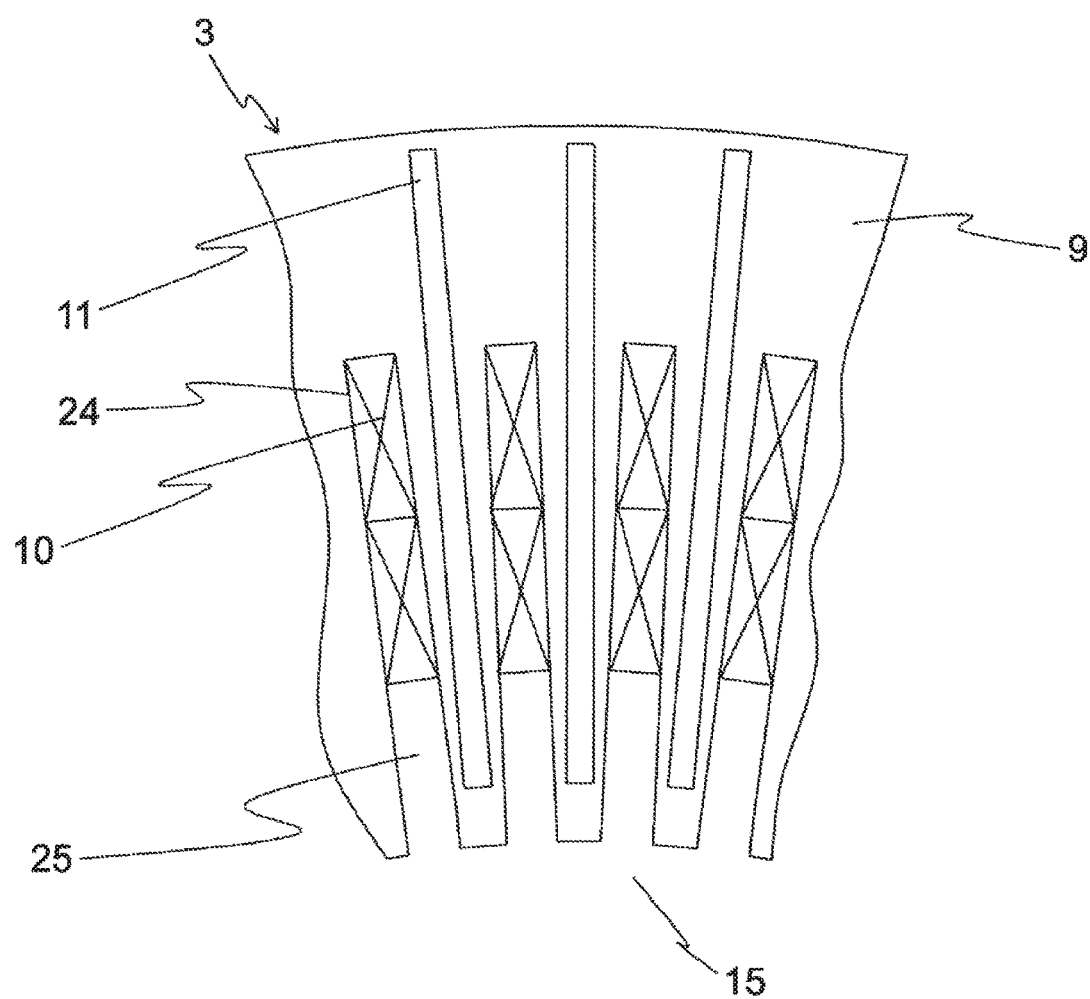
FIG. 18 is an illustration for showing an implementation method of the rotating electrical machine (embodiment 7)

FIG. 18 is a cross-sectional view of a stator configuring an embodiment 7 according to the invention. As shown in FIG. 18, in the configurations shown in the embodiments 1 to 6, an air gap 25 is formed by placing the coil 10 to be disposed in a slot 24 provided in the stator 3, on the outside diameter side within a slot 24. Because the air gap 25 communicates with the gap 15, thereby providing an effect that an area into which the refrigerant 13 flows is increased, so that an increase in flow rate of the refrigerant 13 can be attempted.

Embodiment 8

Figure 19:
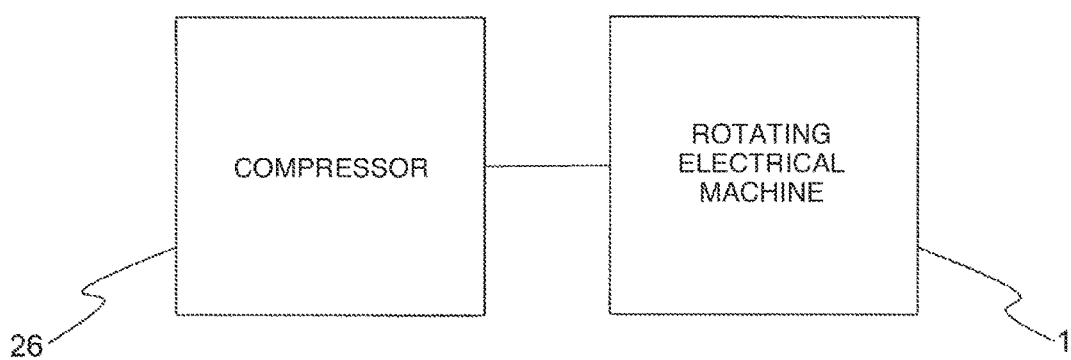
FIG. 19 is an illustration for showing an implementation method of the rotating electrical machine (embodiment 8).

FIG. 19 shows an example in which the rotating electrical machine of the invention is applied to a compressor system. As shown in FIG. 19, the rotating electrical machine 1 shown in the embodiments 1 to 7 is directly connected to a compressor 24 to drive. Conventionally, a speed-up gear is disposed between the rotating electrical machine 1 and a compressor 26 because of the speed-up, but the speed-up allows the rotating electrical machine 1 to be directly connected to the compressor 26.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A rotating electrical machine including a rotor and a stator,
   wherein the stator includes a coil and a stator core,
   the coil is disposed in a circumferential direction of the stator,
   in the stator core, laminated electromagnetic steel sheets formed by laminating a plurality of electromagnetic steel sheets in an axial direction are divided into a plurality of sets of packet cores, and between one of the packet cores of the plurality of sets and an adjacent, other packet core, there is formed a duct providing a flow channel to cause a refrigerant to flow in a diameter direction of the stator,
   the packet core and the duct are configured to be alternately arranged in an axial direction, and,
   the duct is configured so that a cross-sectional area of the flow channel on an inflow side of the refrigerant is larger than that on an outflow side.

2. The rotating electrical machine according to claim 1,
   wherein the packet core and the duct are configured to be alternately arranged in the axial direction, and
   in a duct situated on the center side from both ends in the axial direction among the duct, there is a portion of two packet cores facing each other across the duct, a diameter direction length of the two packet cores being gradually increased with distance from the center to both ends in the axial direction.

3. The rotating electrical machine according to claim 1,
   wherein between one of the packet cores of the plurality of sets and another packet core adjacent to it, there is formed the duct providing a flow channel to cause the refrigerant to flow in the diameter direction of the stator, and the packet core and the duct are configured to be alternately arranged at unequal intervals in the axial direction.

4. The rotating electrical machine according to claim 1, wherein there is a portion gradually enlarging with distance from ends of the stator core on an inside diameter side at both ends of the stator in the axial direction to the center in the axial direction.

5. The rotating electrical machine according to claim 1, wherein there is a portion in which a rotor outside diameter at both ends of the rotor in the axial direction is gradually increased with distance from the ends to the center in the axial direction.

6. The rotating electrical machine according to claim 1, wherein a slot is provided to dispose the coil in the stator, the coil is disposed within the slot on an outside diameter side, and an air gap is provided on the inside diameter side, inside of the disposed coil.

7. A compressor system, wherein the rotating electrical machine according to claim 1 is used as a driving machine for a compressor.

8. A rotating electrical machine including a rotor and a stator,
wherein the stator includes a coil and a stator core,
the coil is disposed in a circumferential direction,
in the stator core, laminated electromagnetic steel sheets formed by laminating a plurality of electromagnetic steel sheets in an axial direction are divided into a plurality of sets of packet cores, and between one of the packet cores of the plurality of sets and another packet core adjacent to it, there is formed a duct providing a flow channel to cause a refrigerant to flow in a diameter direction of the stator,
the packet core and the duct are configured to be alternately arranged in the axial direction,
in a duct situated at the center from both ends in the axial direction among the duct, there is a portion of two packet cores facing each other across the duct, a diameter direction length of the two packet cores becoming long with distance from the center to both ends in the axial direction, and
a clamp of the stator to ensure a surface pressure applied to the laminated stator core is provided on both sides of the stator in the axial direction and in the packet core on both sides of the duct at the center in the axial direction.

* * * * *